(12) United States Patent
Gonring

(10) Patent No.: US 11,718,375 B2
(45) Date of Patent: *Aug. 8, 2023

(54) LANYARD SYSTEM AND METHOD FOR A MARINE VESSEL

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

(*) Notice: Subject to any disclaimer, the term of this patent is extended or adjusted under 35 U.S.C. 154(b) by 169 days.

This patent is subject to a terminal disclaimer.

(21) Appl. No.: 17/240,690

(22) Filed: Apr. 26, 2021

(65) Prior Publication Data

US 2021/0245855 A1    Aug. 12, 2021

Related U.S. Application Data

(63) Continuation of application No. 16/911,055, filed on Jun. 24, 2020, now Pat. No. 11,014,642, which is a
(Continued)

(51) Int. Cl.
| | |
|---|---|
| *B63C 9/00* | (2006.01) |
| *B63H 21/21* | (2006.01) |
| *G01S 19/13* | (2010.01) |
| *H04W 4/021* | (2018.01) |
| *G01S 19/52* | (2010.01) |
| *H04B 1/3822* | (2015.01) |

(52) U.S. Cl.
CPC ........... *B63C 9/0005* (2013.01); *B63H 21/21* (2013.01); *G01S 19/13* (2013.01); *H04W 4/021* (2013.01); *B63H 2021/216* (2013.01); *G01S 19/52* (2013.01); *H04B 1/3822* (2013.01)

(58) Field of Classification Search
CPC ............... B63C 9/0005; B63H 21/21; B63H 2021/216; G01S 19/13; G01S 19/52; H04W 4/021; H04B 1/3822
See application file for complete search history.

(56) References Cited

U.S. PATENT DOCUMENTS

| | | |
|---|---|---|
| 4,250,358 A | 2/1981 | Gilbertson |
| 6,150,928 A | 11/2000 | Murray |
| (Continued) | | |

FOREIGN PATENT DOCUMENTS

| | | |
|---|---|---|
| EP | 3608215 A1 | 2/2020 |
| ES | 2213478 A1 | 8/2004 |
| (Continued) | | |

*Primary Examiner* — Hussein Elchanti
(74) *Attorney, Agent, or Firm* — Andrus Intellectual Property Law, LLP

(57) ABSTRACT

A wireless lanyard system for a marine vessel propelled by at least one propulsion device, the system comprising an operator fob configured to be worn by an operator of the marine vessel, a helm transceiver configured to receive radio signals from the operator fob an a controller. The controller is configured to define a permitted zone with respect to a helm area of the marine vessel based on at least one vessel condition, determine based on communications between the operator fob and the helm transceiver whether the operator is within the permitted zone with respect to the helm area, and generate a lanyard event when the operator is not within the permitted zone.

21 Claims, 6 Drawing Sheets

Related U.S. Application Data continuation of application No. 16/046,672, filed on Jul. 26, 2018, now Pat. No. 10,730,600.

(56) References Cited

U.S. PATENT DOCUMENTS

| | | | |
|---|---|---|---|
| 6,450,845 B1* | 9/2002 | Snyder | B60N 2/002 440/1 |
| 6,476,708 B1 | 11/2002 | Johnson | |
| 6,566,997 B1 | 5/2003 | Bradin | |
| 6,650,227 B1 | 11/2003 | Bradin | |
| 7,081,028 B1 | 7/2006 | Crane | |
| 7,355,518 B1* | 4/2008 | Staerzl | B60N 2/002 340/984 |
| 8,406,944 B2 | 3/2013 | Garon et al. | |
| 9,284,032 B1 | 3/2016 | Snyder et al. | |
| 10,730,600 B2* | 8/2020 | Gonring | F02P 11/00 |
| 2009/0219160 A1 | 9/2009 | Shervey et al. | |
| 2015/0019045 A1* | 1/2015 | Holliday | G06K 7/10366 701/2 |
| 2017/0221657 A1* | 8/2017 | Barker | A63B 22/0605 |
| 2019/0003837 A1* | 1/2019 | Huhnke | G06Q 40/08 |
| 2019/0041857 A1 | 4/2019 | Tamura et al. | |
| 2019/0106189 A1 | 4/2019 | Tamura et al. | |
| 2019/0112020 A1 | 4/2019 | Tamura et al. | |
| 2019/0176950 A1 | 6/2019 | Whiteside et al. | |
| 2021/0160661 A1* | 5/2021 | Czarnecky | H04L 67/52 |
| 2022/0377494 A1* | 11/2022 | Jones | G08G 5/0008 |

FOREIGN PATENT DOCUMENTS

| | | |
|---|---|---|
| FR | 2487286 A3 | 1/1982 |
| GB | 2523842 A | 9/2015 |
| IT | 20100208 A1 | 6/2012 |
| WO | 9209477 A1 | 6/1992 |

* cited by examiner

LANYARD SYSTEM AND METHOD FOR A MARINE VESSEL

CROSS REFERENCE TO RELATED APPLICATIONS

This patent application is a continuation of U.S. patent application Ser. No. 16/911,055, filed Jun. 24, 2020, which is a continuation of U.S. patent application Ser. No. 16/046,672, filed on Jul. 26, 2018, which is incorporated herein by reference in its entirety.

FIELD

The disclosure generally relates to lanyard systems for marine vessels and, more particularly, to lanyard systems that integrate with and provide control input for controlling a propulsion device according to operator location, including cordless lanyard systems that adjust operator location requirements based on one or more conditions of the marine vessel.

BACKGROUND

The following U.S. Patents and Applications provide background information and are incorporated herein by reference in entirety.

Various devices and procedures have been developed to assure that an operator of a marine vessel is in a proper position at the helm of the vessel, which are generally referred to as lanyard systems. These lanyard systems vary from simple cords attached between the operator and a kill switch to turn off the marine engine when the operator leaves the helm station to more complex "cordless" systems that use radio signals, infrared technology, or other sensing methodologies to sense the presence of the operator at the helm area.

U.S. Pat. No. 4,250,358 discloses a safety stop switch for a marine engine includes a control unit housing, and a normally closed, single throw toggle switch mounted on the housing and including a switch arm extending away from the housing to permit operation of the switch between closed and open positions. The switch is electrically connected to the engine to interrupt engine operation when switched to the open position. A hood extends from the periphery of the housing and covers the switch arm when in the closed position, and has a peripheral lip which is spaced from the switch arm a dimension which is less than the thickness of a key which encircles the switch arm. A lanyard is connected to the key and to the boat operator, and upon the exertion of a force on the lanyard, the key pulls the switch arm down into the open position, thereby interrupting operation of the marine engine.

U.S. Pat. No. 7,081,028 discloses an engine control system for a marine propulsion system uses a portable control device that is configured to emit first and second signals that are receivable by first and second sensors. The first signal relates to the starting of the engine of the marine propulsion system by the operator. The second signal relates to the presence of the operator, wearing the portable control device, within a predescribed zone surrounding the second sensor near the helm position.

U.S. Pat. No. 7,355,518 discloses a monitoring system detects the presence or absence of a marine vessel operator within a defined zone near the helm of a marine vessel. The detection is accomplished through the use of a provision of an e-field and the detection of e-field strength by a receiving antenna system. When the operator is in the proper helm position, the e-field strength is diminished by the presence of a portion of the operator's body within the e-field zone.

U.S. Pat. No. 6,566,997 discloses a reader unit for use in a radio frequency identification (RFID) system delays the initiation of an interrogation operation when potentially interfering radio frequency (RF) energy is detected within an operational frequency range of the system. The reader unit waits a quasi-random period of time after the detection and then senses the spectral environment again to determine whether the energy is still present. If the energy is still present, the reader unit waits another quasi-random period and the process repeats. If there is no energy present or the energy is below a threshold value, the reader unit immediately initiates the interrogation operation. By delaying the initiation of the interrogation operation until the operative frequency range is free of potential interferers, the likelihood of harmful interference effects is significantly reduced.

U.S. Pat. No. 6,650,227 discloses a reader for an RFID system has an exciter circuit for generating an excitation signal and a feedback circuit coupled to the exciter circuit for automatically tuning the exciter circuit. The exciter circuit has at least one retunable component providing the exciter circuit with adjustable component values and a plurality of signal generating states. The exciter circuit is initially tuned to a first signal generating state, but is retunable to additional signal generating states by adjusting the component value of the retunable component. The feedback circuit includes a circuit evaluator coupled to the exciter circuit for determining a value of an operational parameter of the exciter circuit. A decision-making circuit is coupled to the circuit evaluator for formulating a decision in response to the value of the operational parameter. An adjustment circuit is coupled to the decision-making circuit and exciter circuit for receiving the decision and conveying an adjustment instruction to the exciter circuit in response to the decision.

U.S. Pat. No. 6,476,708 discloses a method is provided for operating an RF transponder system to detect the presence of an RFID device in the proximal space of an RF reader unit having an excitation signal generator circuit and an RFID device detection circuit. The excitation signal generator circuit unit initially operates in a reduced power state, generating ring signals in response to a reduced electrical current and transmitting the ring signals into the proximal space. The RFID device detection circuit evaluates the ring signals to determine variations in an RFID device detection parameter. When the variations pass a variation threshold level due to the presence of the RFID device, the ring signals are terminated and the excitation signal generator circuit switches to an increased power state, wherein the excitation signal generator circuit generates an RF excitation signal which is transmitted to the RFID device.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a wireless lanyard system for a marine vessel propelled by at least one propulsion device includes an operator fob worn by an operator of the marine vessel, a helm transceiver at a helm area of the marine vessel configured to receive radio signals from the operator fob, and a lanyard control module. The lanyard control module is executable on a processor and configured to determine, based on communications between the operator fob and the helm transceiver, whether the operator is within a permitted zone with respect to the helm area, and to generate a lanyard event when the operator is not within the permitted zone. Upon generation of the lanyard event, the system is configured to reduce an RPM of an engine in the propulsion device to an idle RPM and/or turn off the propulsion device.

In other embodiment, a lanyard system for a marine vessel propelled by at least one propulsion device includes an operator device worn by an operator of the marine, a receiver device at the helm area of the marine vessel, and a lanyard control module. The receiver is configured to detect whether the operator is within the permitted zone with respect to the helm area. The lanyard control module is executable on a processor and configured to generate a lanyard event when the operator is not detected within the permitted zone and, upon generation of the lanyard event, reduce an engine RPM of an engine in the propulsion device to an idle RPM, and control a gear system of the propulsion device to shift to a neutral gear position.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
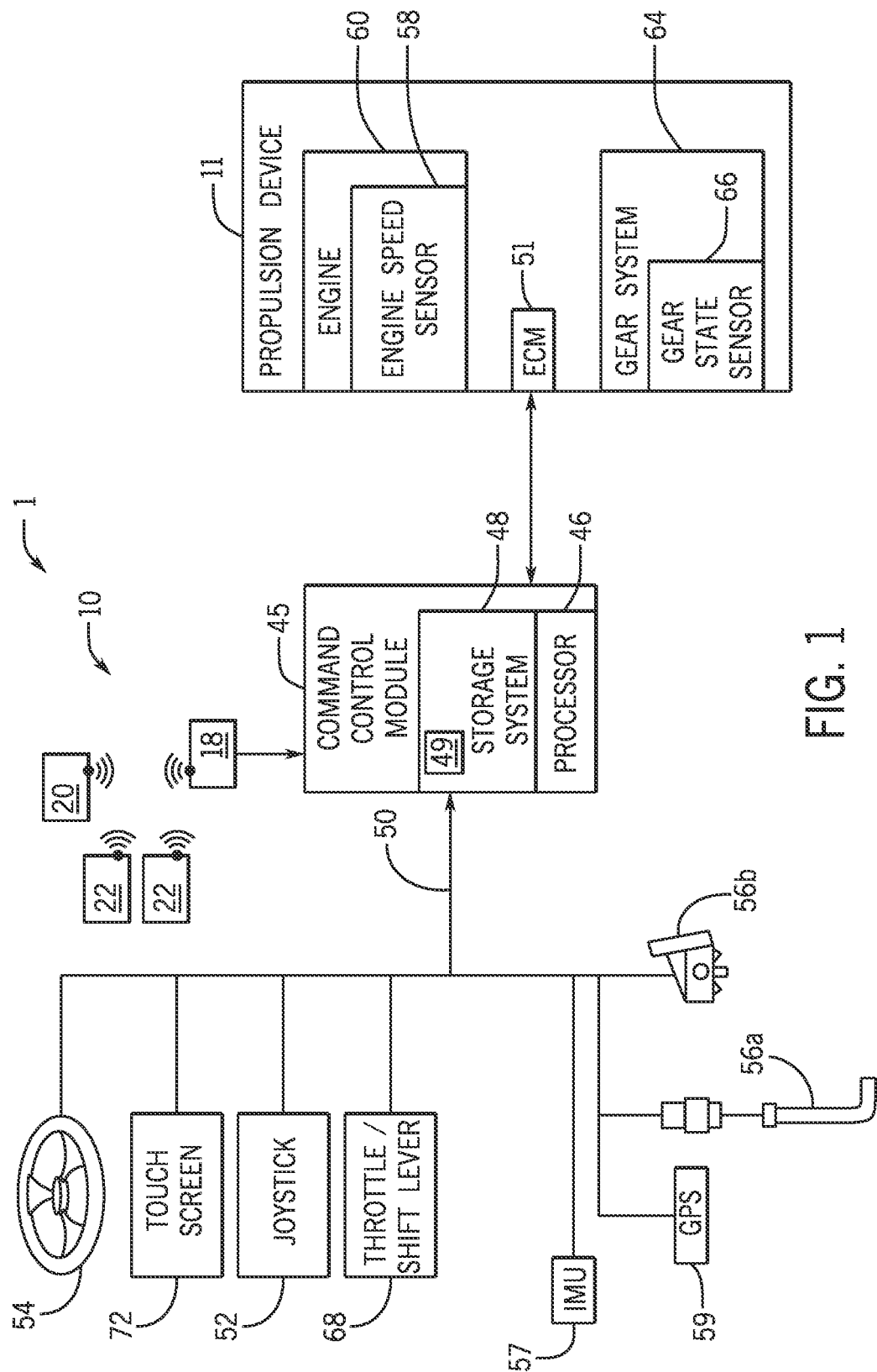
FIG. 1 schematically depicts a propulsion control system with an integrated lanyard system being a wireless lanyard system.

The present disclosure relates to lanyard systems for marine vessels. The inventor has recognized that those skilled in the art of marine vessel control are familiar with lanyard systems. Traditional wired lanyard systems have existed for decades which, if utilized properly, stop the engine if the operator leaves the helm area, such as accidentally falls overboard. Corded lanyard systems are well known in the relevant art, one example of which is shown and described at U.S. Pat. No. 4,250,358, which has been incorporated herein. Traditional corded lanyard systems consist of a mechanical switch mounted at the helm and a tether (or cord) which physically connects the user to the switch. If the operator moves too far away from the helm, the switch is pulled and the ignition is shut off. The area that the operator must stay within is determined by the length of the tether cord.

Although very effective and low cost, the corded lanyards are sometimes considered a nuisance and thus are not preferred by many boaters. Accordingly, corded lanyard systems often go unused leaving no operator location safety system in place to stop the propulsion device if the operator were to leave the helm area, such as due to accidentally falling overboard. To address this issue, different wireless solutions have been developed that wirelessly locate the operator within the helm area and turn off the propulsion device if the operator is not located. Certain examples of wireless lanyard systems are shown and described at U.S. Pat. Nos. 7,081,028 and 7,355,581, which are incorporated herein by reference.

Through experimentation and research in the relevant field, the inventor has recognized problems with existing wireless lanyard systems for use in marine applications. Firstly, the inventor has recognized that current lanyard systems, whether corded or cordless, operate to turn off a propulsion device when an operator is not detected. The inventor has recognized that turning off the propulsion device, such as suddenly cutting the engine, is suboptimal and can create a dangerous situation for passengers on the marine vessel. For example, passengers can be injured due to aggressive speed change of a marine vessel when the engine is suddenly turned off, especially when the marine vessel is traveling at high speeds. Additionally, turning off the propulsion device is undesirable because passengers typically need to take over operation of the marine vessel immediately, such as to pick up a driver who may have fallen overboard. Thus, turning off the engine is undesirable, especially if the operator lanyard device is needed to operate the propulsion system.

In view of the foregoing problems and challenges, the inventor has recognized that a more desirable operation for a lanyard system is to reduce operation of the propulsion device to idle and then automatically shift to neutral, rather than turning off the propulsion device. Thereby, the propulsion device can then be made immediately available for operation by another passenger, such as to pick up an operator who may have fallen overboard or to otherwise take over the operator position at the helm. For example, the engine RPM may be reduced at a pre-set reduction rate, which may be the fastest safe rate of reducing engine RPM for a given marine vessel. Thereby, the marine vessel can be stopped more safely when an operator is not detected, and the marine vessel can be made immediately available to any operator who takes over at the helm.

The inventor has recognized that further aspects of currently available wireless lanyard systems make them undesirable for use in marine applications. For example, in embodiments where a fob is worn by the operator, an operator must remember to turn on and off the wireless lanyard system when the operator is on board the marine vessel—e.g., when the operator is driving the marine vessel at high speeds, versus engaging in some activity when the operator is not at the helm. For example, operators often move around the marine vessel when the marine vessel is operating at slow speeds and on autopilot, such as to prepare the marine vessel to approach shore or a mooring position. Thus, a wireless lanyard system would need to be turned off in order to be able to do so. An operator carrying a fob may forget to turn off the wireless lanyard system and thus may unwittingly cause shut down of the propulsion system when the operator leaves the helm area.

Thus, the inventor has recognized that a more desirable and better functioning wireless lanyard system automatically turns off, or otherwise does not interfere with the propulsion system, when a marine vessel is operating below a threshold low vessel speed, when an engine of the propulsion device is operating a predetermined threshold RPM, and/or when a gear system of the propulsion device is in a neutral gear position. Thereby, the lanyard system will not interfere with the functioning of the propulsion system during times when operator location monitoring is unnecessary, such as at low-speed operation and/or at idle conditions. Furthermore, in certain embodiments the system may provide a warning period prior to generating a lanyard event, to allow an operator an opportunity to return to the permitted zone to prevent generation of a lanyard event.

Furthermore, the disclosed wireless lanyard system may automatically adjust the radius of the permitted zone around the helm area based on one or more conditions of the marine vessel. For example, the wireless lanyard system may automatically increase or decrease the permitted zone around the helm area based on changes in boat speed or engine speed such that an operator is permitted to move more freely around the vessel at low operating speeds, but is confined to the helm area when the marine vessel is operating at high speeds. Additionally, the wireless lanyard system may receive input from navigation or GPS mapping systems and may restrict the operator to the helm in high traffic areas or near shorelines, docks, bridges, etc. Thereby, the wireless lanyard system becomes more user-friendly by providing safety operation that is tailored to the current conditions of the marine vessel.

FIG. 1 schematically depicts a propulsion control system 1 associated with a marine vessel. The propulsion control system 1 includes a control module 45, such as a command control module or a helm control module, which is programmable and includes a processor 46 and a memory 48. The propulsion control system 1 includes a lanyard system 10 configured to detect whether an operator 12 is within a permitted zone Z with respect to a helm area 15 on a marine vessel 14 (see FIGS. 3 and 4). In the depicted embodiment, the lanyard system 10 is a wireless system including a helm transceiver 18 in radio communication with a wireless operator fob 20 wore by an operator of the vessel 14. The lanyard system 10 further includes a lanyard control module 49, which is a set of software instructions executable on a processor and configured to determine whether the operator is within a permitted zone with respect to the helm area, and to generate a lanyard event when the operator is not detected within the permitted zone. The propulsion control system 1 is then configured such that, upon generation of a lanyard event, the one or more propulsion devices 11 associated with the system are controlled to reduce the engine RPM of each respective engine 60. In certain embodiments, the system 1 may be configured to shift a gear system 64 into a neutral gear position. Such embodiment may be incorporated in propulsion control systems 1 having a digital throttle shift (DTS) system wherein the throttle and shift control is digitally provided, such as in the arrangement of FIG. 1. In other embodiments where the throttle/shift lever 68 is directly linked to the gear system 64, the system 1 may be configured to turn off the propulsion device 11 after detection of a lanyard event.

In the example shown, the wireless lanyard system 10 is incorporated and in communication with the command control module (CCM) 45. The CCM 45 stores and executes the lanyard control module 49, including executing logic to determine whether the operator is within the permitted zone, generating a lanyard event, and providing control instructions to the propulsion device 11 accordingly. The CCM 45 is programmable and includes a processor 46 and a memory 48. In the depicted embodiment, the lanyard control module 49 is stored on the storage system 48 and executable on the processor 46 of the CCM 45. Accordingly, the helm transceiver 18 communicates with the CCM 45 to effectuate the wireless lanyard system 10. For example, the CCM 45 may communicate with one or more control modules for the respective propulsion devices 11 incorporated within the system 1. In the depicted embodiment, the CCM 45 communicates with an engine control module (ECM) 51 for each propulsion device 11. Thereby, the CCM 45 can instruct each ECM 51 in order to effectuate certain control actions, for example, changing the engine speed and/or gear state of each propulsion device 11 in response to a lanyard event.

Only one propulsion device 11 is shown in FIG. 1; however, it will be known to a person having ordinary skill in the art that any number of one or more propulsion devices may be incorporated within the system 1. In various embodiments, the propulsion devices 11 may be an outboard motor, an inboard motor, a stern drive, or any other propulsion device available for propelling a marine vessel 14. Similarly, the propulsion device 11 may incorporate an internal combustion engine or may be an electric powered propulsion device, such as an electric motor.

The CCM can be located anywhere on the marine vessel 14, and/or located remote from the marine vessel 14. The CCM 45 communicates with various components of the system 1 via wired or wireless links, as will be explained further hereinbelow. A person having ordinary skill in the art viewing this disclosure will understand that the lanyard control module 49, and the methods disclosed and discussed herein, can be carried out by various control elements within the system 1, and may be carried out by a single control module or by several separate control modules that are communicatively connected.

Figure 2:
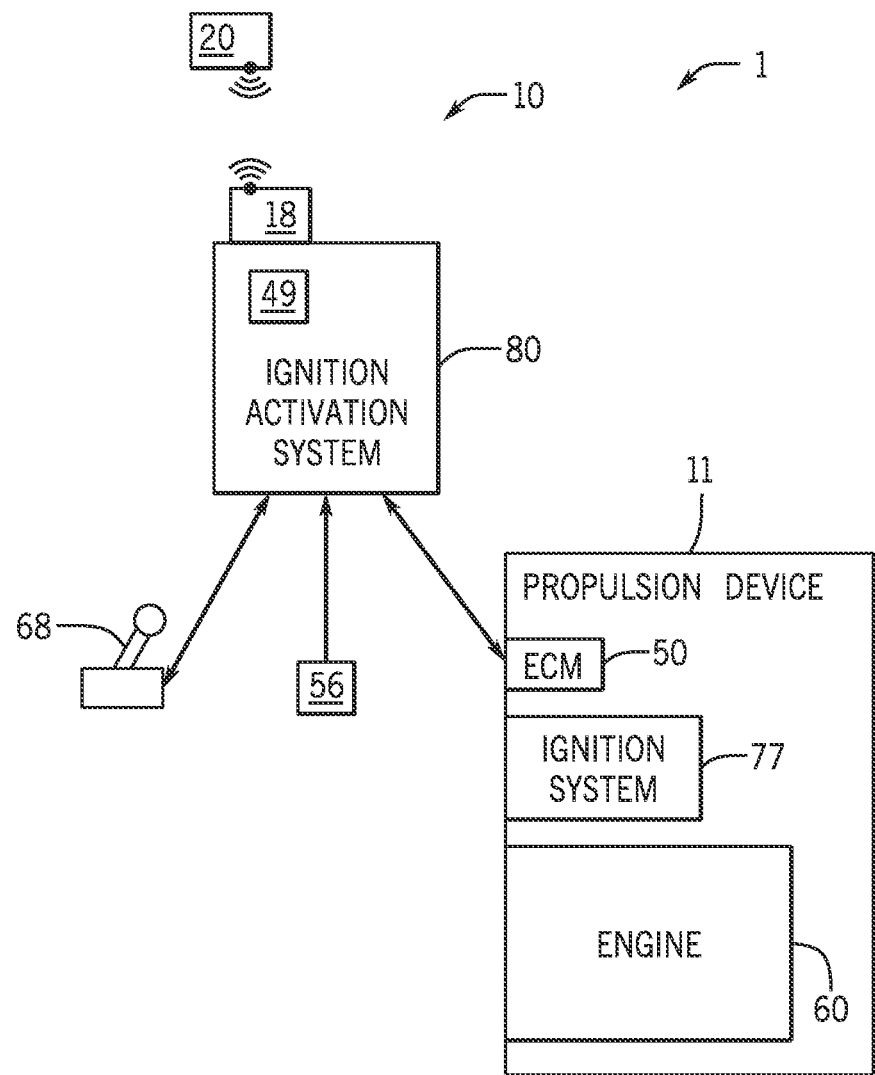
FIG. 2 schematically depicts another embodiment of a propulsion control system including a lanyard system.

In certain embodiments, the lanyard control module 49 may be carried out by a dedicated controller. FIG. 2 shows one such example, where an ignition activation system 80 is installed within the ignition system of the marine vessel. In shift/throttle systems having direct linkages connecting a throttle/shift lever to the throttle and gear systems of the propulsion device, control of engine speed and/or gear position by the lanyard control module 49 is not possible. Thus, the system 1 may be configured, similar to traditional lanyard systems, to turn off the propulsion device in response to a lanyard event. In the depicted embodiment, the lanyard control module 49 receives input from the helm transceiver 18 to determine whether to stop the propulsion device 11. For example, if an operator is no longer detected within the permitted zone Z and a lanyard event is generated, then the ignition activation system 80 may be controlled to stop, or turn off, the engine 60. In such an embodiment, the ignition activation system 80 may include or may be integrated with the on/off user controls for the propulsion control system 1, such as a traditional key-operated system or a keyless system with a start/stop button, and may be connected to the engine emergency stop circuit.

A person having ordinary skill in the art will recognize that the exemplary control arrangements shown in FIGS. 1 and 2 are not limiting and that the propulsion control system 1 and lanyard system 10 may take any of various forms and be executed by one or more of various control modules. Furthermore, certain embodiments of the lanyard system described herein may be effectuated by and utilize a traditional corded lanyard, such as connected to a switch that changes states when the lanyard cord becomes disconnected. For example, the wireless lanyard system 10 shown in FIG. 1 may be replaced with a traditional corded lanyard system, where a cord attaches at a helm device configured to communicate with the CCM 45 such that if the cord becomes detached from the helm device then a lanyard event is generated.

The CCM 45 (and/or the ignition activation system 80) may be a computing system that includes a processing system, storage system, software, and input/output (I/O) interfaces for communicating with devices such as those shown in FIGS. 1 and 2. The processing system loads and executes software from the storage system 48, such as software programmed with the lanyard control module 49. When executed by the CCM 45, lanyard control module 49 directs the processing system 46 to operate as described below in further detail to execute the lanyard control method. The computing system may include one or more application modules and one or more processors, which may be communicatively connected. The processing system can comprise a microprocessor (e.g., processor 46) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system 48 can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system 46. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the CCM 45 communicates with one or more components of the system 1 via a communication link 50, which can be a wired or wireless link. The CCM 45 is capable of monitoring and controlling one or more operational characteristics of the system 1 and its various sub-systems by sending and receiving control signals via the communication link 50. In one example, the communication link 50 is a controller area network (CAN) bus, but other types of links could be used. It should be noted that the extent of connections of the communication link 50 shown herein is for schematic purposes only, and the communication link 50, in fact, provides communication between the CCM 45 and each of the sensors, devices, etc. described herein, although not every connection is shown in the drawing for purposes of clarity.

As mentioned, the central control module may receive, either directly or indirectly, inputs from several different sensors and/or input devices aboard or coupled to the marine vessel 14. For example, the CCM 45 may receive a steering input from a joystick 52 and/or a steering wheel 54. The CCM 45 may receive an input from one or more vessel speed sensors 56. The vessel speed sensor 56 may be, for example, a pitot tube sensor 56a, a paddle wheel type sensor 56b, or any other speed sensor appropriate for sensing the actual speed of the marine vessel. Alternatively or additionally, the vessel speed may be obtained by taking readings from a GPS device 59, which calculates speed by determining how far the marine vessel 14 has traveled in a given amount of time. Similarly, the CCM 45 may receive input from a position determination device, such as GPS 59, continuously tracking and providing global position information describing the current location of the marine vessel. The propulsion device 11 is provided with an engine speed sensor 58, such as but not limited to a tachometer, which determines a speed of the engine 60 in rotations per minute (RPM). The engine speed can be used along with other measured or known values to approximate a vessel speed (i.e., to calculate a pseudo vessel speed). The system 1 may further include and vessel attitude sensor 57 sensing the orientation of the vessel with respect to an inertial frame of reference. For example, the vessel attitude sensor 57 may be an internal measurement unit (IMU) comprising a gyroscope, such as a three-axis gyroscope, to detect vessel orientation information. Alternatively or additionally, the attitude sensor 57 may include a magnetometer or may include any other type of position or inertial measurement unit, such as a combination accelerometer and/or gyroscope with a magnetometer.

A gear system 64 and gear state sensor 66 can also be provided for the propulsion device 11. For example, the gear state sensor 66 may provide an output indicating whether the gear system 64 (which may take any of various forms known in the art, such as a dog clutch) is in a forward gear state, a neutral state, or a reverse gear state. In certain embodiments, the outputs of the gear state sensor 66 and/or the engine speed sensor 58 may be provided directly to the CCM 45. In other embodiments, the gear state and engine speed information may be provided to an intermediary control device, such as an engine control module, which may then make such information available to the CCM 45.

Other inputs to the system 1 can come from operator input devices such as a throttle/shift lever 68, a steering wheel 54, a keypad 70, and a touchscreen 72. The throttle/shift lever 68 allows the operator of the marine vessel to choose to operate the vessel in neutral, forward, or reverse, as is known, and the gear system 64 is positioned accordingly. The keypad 70 can be used to initiate or exit any number of control or operation modes (such as to activate and deactivate the lanyard system 10) or to make selections while operating within one of the selected modes.

FIG. 2, the lanyard system 10 interfaces with a more limited propulsion system 1, which may be representative of an embodiment installed on a marine vessel 14 having a traditional physical link between a throttle/shift lever 68 and a gear system 64 associated with the propulsion device 11. Thus, the lanyard control module 49 may not be operable to control a gear position of the gear system 64, but may instead be operable to turn off the engine 60, such as via the ignition system 77. For example, the ignition system 77 to immediately stop the engine 60 upon generation of a lanyard event. While such a system would not enable an embodiment where engine RPM and gear position are controlled in response to a lanyard event, improved wireless lanyard system functionality can still be provided in the system configuration shown in FIG. 2 (which is also provided in the embodiment of FIG. 1) including automatically turning on and off the wireless lanyard system 10, such that monitoring of the permitted zone Z occurs at appropriate vessel conditions and no lanyard event is generated when operating at low speeds and/or when the system is in neutral gear position. For example, the lanyard control module 49 may receive an engine speed from the ECM 51, and may refrain generating a lanyard event when the engine speed is below a threshold engine speed—e.g., engine speed above a threshold is a condition for generating a lanyard event. Alternatively, the lanyard control module 49 may receive a gear position signal or handle position signal from the throttle/shift lever 68 and may refrain from generating a lanyard event when the throttle-shift lever position indicates that the gear system 64 is in a neutral gear position. In still other embodiments, the lanyard control module 49 may be configured to receive vessel speed from a vessel speed sensor 56 (and/or a GPS 59), and may operate such that no lanyard event is generated when the speed of the marine vessel is below a threshold vessel speed. For example, the lanyard control module 49 may check any one of the foregoing vessel conditions prior to generating a lanyard event. In still other embodiments, the lanyard control module 49 may be configured to turn off or instruct one or more of the wireless operator fob 20 or the helm transceiver 18 to turn off when the conditions are such that the lanyard system is not needed—e.g., engine speed or vessel speed below the threshold, or gear position is neutral. In one embodiment, the lanyard control module 49 may instruct the helm transceiver not to initiate signal communication with the wireless operator fob 20, thereby deactivating the lanyard system 10 and conserving battery life of the wireless operator fob 20 and also reducing energy consumption by the helm transceiver 18.

In various embodiments, the lanyard system 10 may be a corded lanyard system or may be a wireless lanyard system. In the wireless embodiment, the wireless lanyard system 10 includes a helm transceiver 18 placed within a helm area 15 of the marine vessel. The helm transceiver 18 receives radio signals from a wireless operator fob 20, and in many embodiments is also configured to transmit radio signals to the wireless operator fob 20. The helm transceiver 18 may be permanently mounted in the helm area 15, such as mounted in or behind the dashboard near the steering wheel 54 and/or throttle/shift lever 68. The helm transceiver 18 is connected to a power source, such as to 12 volt DC power provided by a battery associated with the propulsion device 11. The helm transceiver 18 further communicates with one or more control modules, such as the CCM 45 or the ignition activation system 80 described in the exemplary embodiments, to indicate whether radio signals are being received from the operator fob 20. In certain embodiments, the helm transceiver 18 and operator fob 20 may communicate to determine an operator distance between the operator fob and the helm transceiver, and in such embodiments, the helm transceiver 18 may further communicate the operator distance to the respective control elements for use by the lanyard control module 49.

The wireless operator fob 20 is an electrical device carried or worn by the operator, which transmits radio signals to the helm transceiver 18. The wireless operator fob is battery-driven, such as containing a replaceable or rechargeable battery. The helm transceiver 18 and wireless operator fob 20 may communicate by any of various wireless protocols. In certain embodiments, the helm transceiver 18 and wireless operator fob 20 may be RFID devices. In one embodiment, the wireless operator fob 20 may contain a passive or active RFID tag, and the helm transceiver 18 may be an active or passive reader, which operator by any of various wireless standards, including Bluetooth standards or 802.11 WLAN.

Figure 3A:
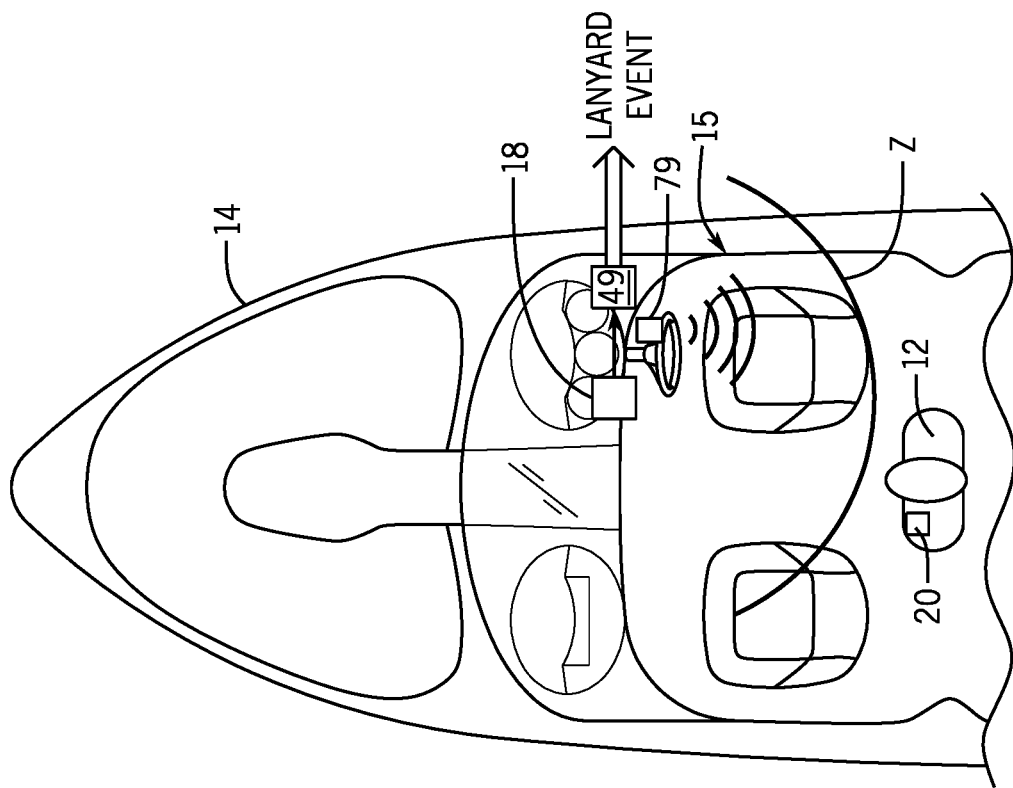
FIGS. 3A and 3B exemplify operation of an embodiment of a wireless lanyard system and method.
Figure 3B:
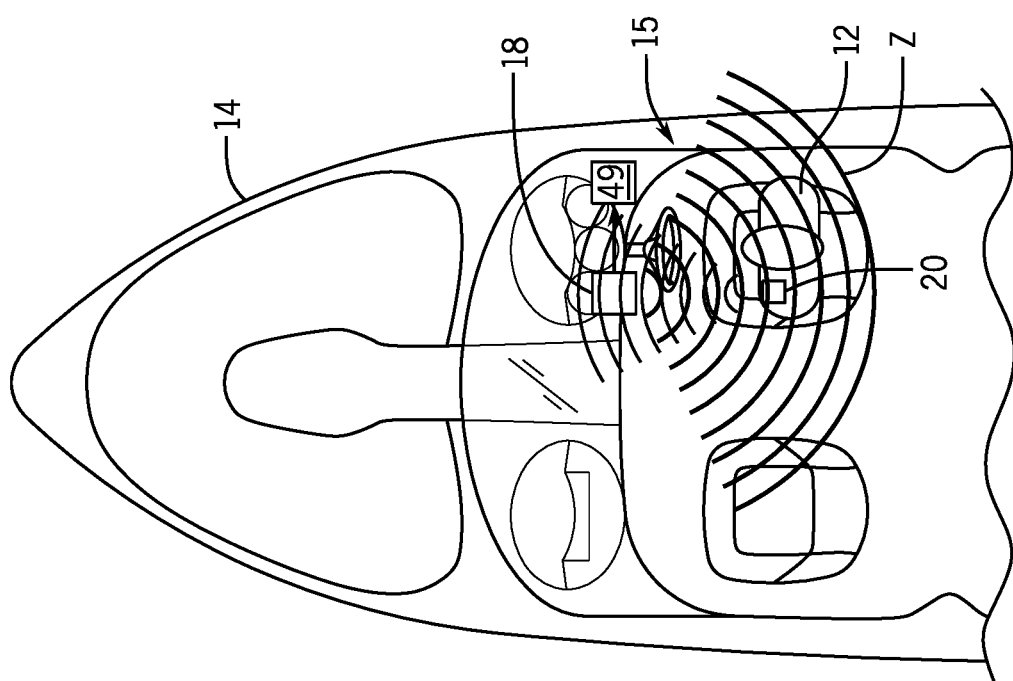

FIGS. 3A and 3B depict operation of one embodiment of the wireless lanyard system 10. The helm transceiver 18 transmits a radio signal to the wireless operator fob 20 worn by the operator 12. The wireless operator fob 20 receives the radio transmission from the helm transceiver 18 and communicates a responsive signal thereto. In one exemplary embodiment, the helm transceiver 18 may begin to "poll" the wireless operator fob 20, such as at a polling rate of once per second. In certain embodiments, the helm transceiver 18 may only generate the inquiry signal to poll the wireless operator fob 20 when the engine 60 is running and/or when certain conditions are met, such as when the engine speed is above a threshold engine speed, the vessel speed is above a threshold vessel speed, and/or when the gear system 64 is shifted out of a neutral position. The wireless operator fob 20 receives the signal and returns a message to the helm transceiver 18 indicating that the signal was received, and thus the operator 12 is present. Such information is then provided to the lanyard control module 49.

If the helm transceiver 18 does not receive a return signal from the wireless operator fob 20, it is assumed that an operator is not present and appropriate action is taken. In certain embodiments, if a return signal is not detected by the helm transceiver 18, then a warning alert is generated, such as an audio and/or a visual alert. For example, a horn 79 may be sounded, which is used to indicate when return signal is detected, or otherwise that the wireless operator fob 20 is outside of the permitted zone Z allowed by the system 10. Alternatively, a visual indicator may be provided, such as via the touchscreen 72 or some other device in the helm area 15 providing a visual warning to the operator to return back within the permitted zone Z as quickly as possible. If the operator does not return to the helm within a predefined warning period and thus no return signal is detected from the operator fob 20 within the predefined warning period, then a lanyard event is generated. In certain embodiments, no warning may be provided, and a lanyard event may be generated immediately upon determining that the operator is not within the permitted zone. In still other embodiments, the warning period may be selectively enacted. For example, in certain embodiments described herein, the wireless lanyard system 10 is configured to determine an operator distance between the operator fob 20 and the helm transceiver 18. In such embodiments, the wireless lanyard system 10 may be configured to provide a warning period if a return signal is detected, but the operator distance is outside of the permitted zone Z. In such systems, the lanyard control module 49 may be configured to bypass the predefined warning period and immediately generate a lanyard if suddenly no return signal from the wireless operator fob is detected, indicating that the operator may have fallen overboard.

In certain embodiments, the helm transceiver 18 and wireless operator fob 20 may be configured to determine a distance therebetween, which is referred to herein as the operator distance. In one embodiment, the wireless operator fob 20 determines the distance to the helm transceiver 18 based on the helm transceiver signal. In one such embodiment, the helm transceiver 18 determines the operator distance based on the time it receives the responsive signal from the operator fob 20 compared to the time it transmitted its inquiry signal to the operator fob 20. In other embodiments, the operator fob 20 may be configured to determine the operator distance— which may be a 'time-of-flight" determination or may be determined based on a measured signal strength of the received inquiry signal—and transmit that operator distance value to the helm transceiver 18.

In other embodiments, the helm transceiver 18 determines whether the operator 12 is within the permitted zone based on whether the operator fob 20 provides a return signal. In such an embodiment, the helm transceiver 18 may transmit a signal of a predefined strength, thus having a predefined range equivalent to the permitted zone Z. Similarly, the wireless operator fob 20 may also be configured to provide a return signal at the signal strength equivalent to the radius of the zone Z. Thus, as shown in the example of FIG. 3B, where the operator 12 is outside of the zone Z, the operator fob 20 does not receive the initial signal from the helm transceiver 18, and thus does not provide a return signal. In that situation where no return signal is detected by the helm transceiver, an alert may be generated for the predefined warning period, after which a lanyard event may be generated and the propulsion device 11 controlled accordingly.

Figure 4:
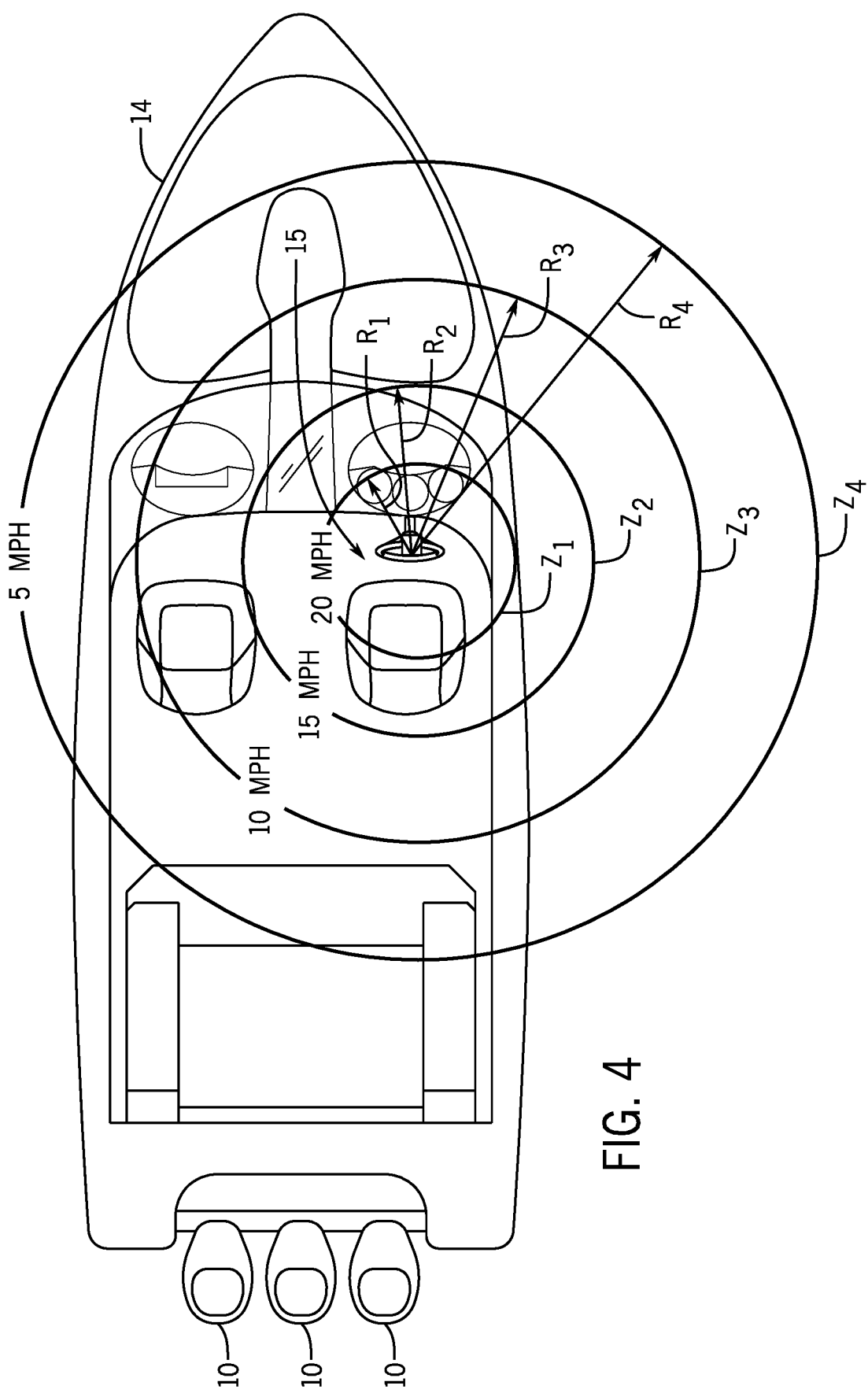
FIG. 4 further exemplifies operation of an embodiment of a wireless lanyard system and method.

In certain embodiments, the wireless lanyard system 10 may be configured to adjust a radius R of the zone Z. FIG. 4 shows one such example, where the radius R of the zone Z is adjusted based on vessel speed. Where the vessel speed is above a high threshold vessel speed, which in the depicted embodiment is 20 miles an hour, the permitted zone Z is restricted to the zone $Z_1$ with radius $R_1$ which closely encircles the helm area 15. In the example, the lanyard control module 49 is configured to provide an increasingly larger permitted zone $Z_1$-$Z_4$ by increasing the radius $R_1$-$R_4$ as the vessel speed decreases from 20 greater than 20 mph to 5 mph or less. Thus, between 20 miles per hour (mph) and 15 mph, the lanyard control module 49 assigns a radius $R_2$ to create permitted zone $Z_2$. Between 15 mph and 10 mph the lanyard control module 49 assigns a radius $R_3$ to create permitted zone $Z_3$. Between 10 mph and 5 mph the lanyard control module 49 assigns radius $R_4$ to create permitted zone $Z_4$, which the operator can occupy without triggering a lanyard event. In certain embodiments, the lanyard control module 49 may be configured such that below a low-speed threshold, such as the exemplary 5 miles an hour, no lanyard event is triggered, such as by ceasing to transmit radio signals from the helm transceiver 18 to the operator fob 20. The radiuses can be defined in either one of two ways described above. Namely, the radius can be defined by the signal strength provided by the helm transceiver 18. Alternatively, the helm transceiver 18 and the operator fob 20 can communicate to determine an operator distance (e.g., determined by the operator fob 20 and communicated to the helm transceiver 18), which can be compared to the assigned radius $R_1$-$R_4$ to determine whether the operator is within the permitted zone $Z_1$-$Z_4$.

The threshold vessel speeds and number of permitted zones in the depicted embodiment are merely exemplary, and a person having ordinary skill in the art will understand in view of this disclosure that any number of zones and any vessel speed thresholds may be provided. Moreover, the number of zones and vessel speed thresholds may be calibratable such as by the OEM upon install of the wireless lanyard system 10 or by the operator, such as via the user interface for controlling the wireless lanyard system 10 (e.g. provided via the touchscreen 72 on the helm control panel). As an alternative to vessel speed, the lanyard control module 49 may define the radius $R_1$-$R_4$ based on engine RPM, such as based pseudo vessel speed approximations calculated based on engine RPM.

Alternatively or additionally, the lanyard control module 49 may be configured to define the radius $R_1$-$R_4$ of the permitted zone $Z_1$-$Z_4$ based on a GPS location of the marine vessel. For example, the lanyard control module 49 may be configured to determine a reduced radius (e.g. $R_1$) when the marine vessel 14 is at a GPS location that is within a predefined high traffic area, such as within certain distances of a shoreline, a dock, a bridge, or the like. For example, geofencing software may be utilized to advise the lanyard control module 49 when the marine vessel crosses into or leaves a defined high traffic area.

In certain embodiments, the wireless lanyard system 10 may further include additional fobs assigned as passenger fobs 22 and exemplified in the system diagram of FIG. 1. The helm transceiver 18 may be further configured to communicate with the wireless passenger fobs 22 to determine the presence or absence of the one or more passengers carrying the passenger fobs based on receipt of radio signals from the wireless passenger fobs 22. Radio communication between the helm transceiver 18 and the wireless passenger fobs 22 may be provided by any of the various radio communication protocols described above. For example, the helm transceiver 18 may generate an inquiry signal to "poll" the location of each wireless operator fob 20. If the inquiry signal generated by the helm transceiver 18 is received at the wireless passenger fob 22, then passenger fob 22 may provide a responsive signal, an operator location signal, identifying itself to the wireless transceiver. The lanyard control module 49 may be configured to determine, upon receipt of the return signal from the wireless passenger fob 22 that the passenger is present on the marine vessel. If no return signal is received from the passenger fob 22, then the lanyard control module 49 may be configured to generate a passenger overboard alert. Such an alert may be an audio and/or visual alert, examples of which are described above. In certain embodiments, the lanyard control module 49 may be configured to disable the passenger location tracking function when at least one of the gear system 64 is in neutral, the engine RPM is below the predetermined threshold RPM, or the vessel speed of the marine vessel 14 is below a threshold vessel speed.

Figure 5:
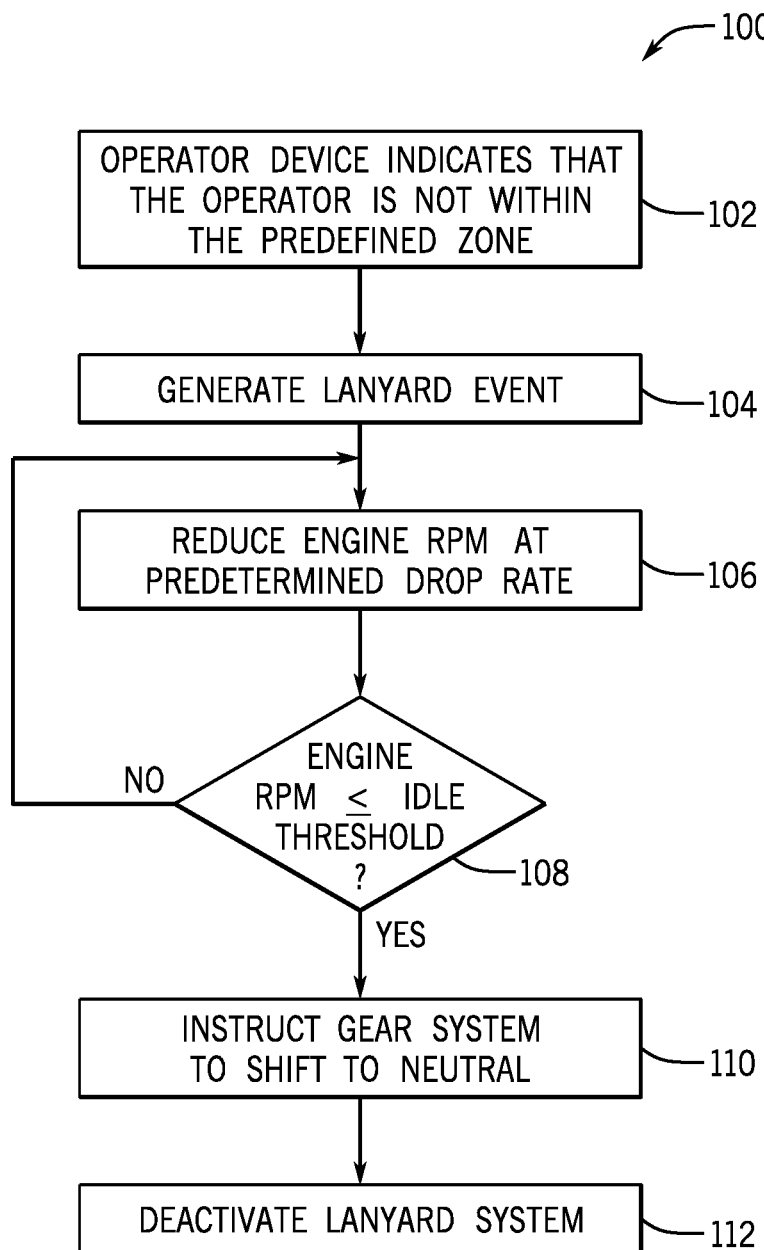
FIGS. 5-6 are flow charts depicting exemplary methods, or portions thereof, of providing a wireless lanyard system for a marine vessel.
Figure 6:
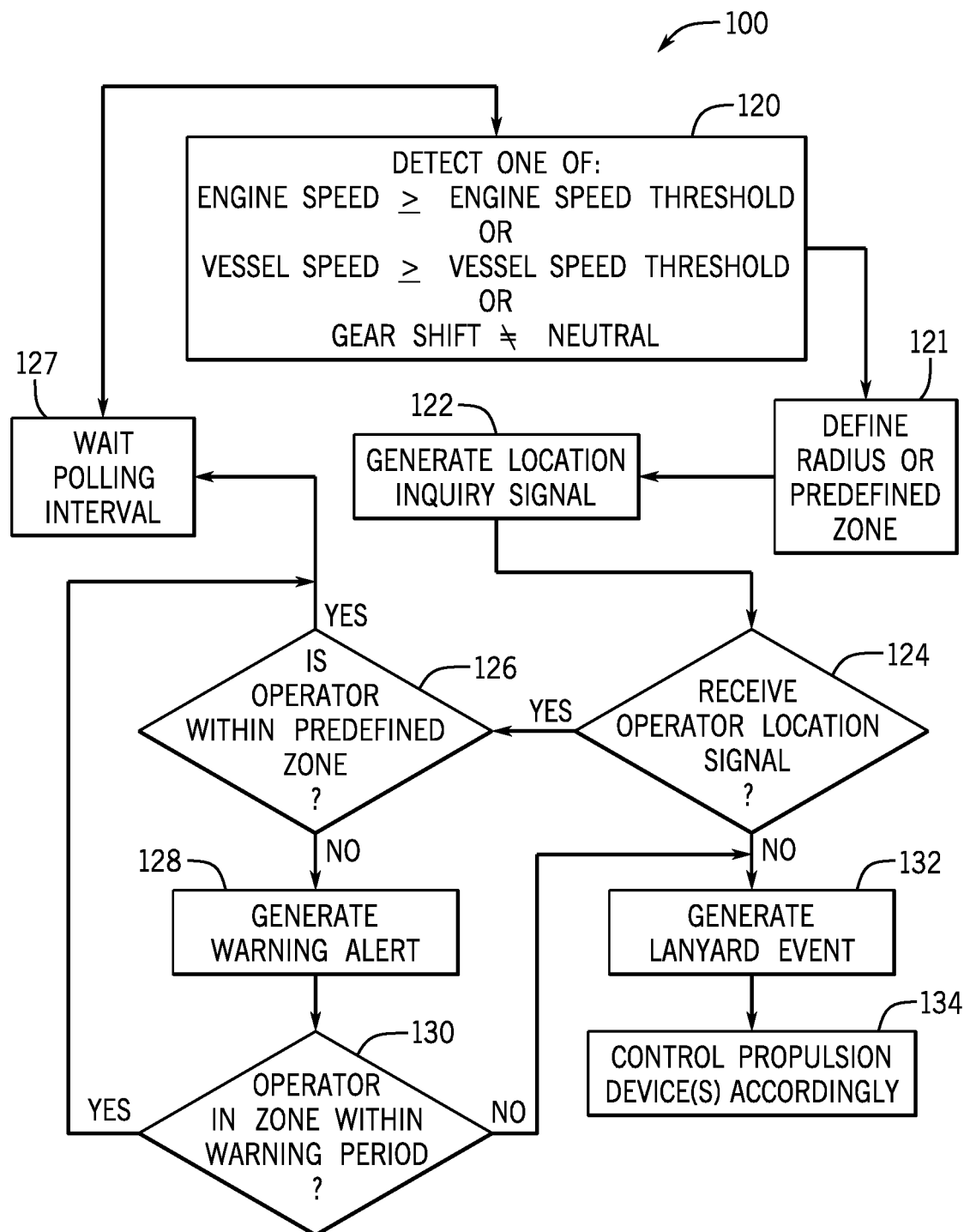

FIGS. 5 and 6 depict exemplary methods 100, or portions thereof, for operating a lanyard system. The exemplary method steps depicted in FIGS. 5 and 6 may, for example, be performed by executing software instructions of the lanyard control module 49. In the method of FIG. 5, step 102 represents determining whether an operator device indicates that the operator is within the permitted zone Z. In the embodiment of a corded lanyard device, this would include whether the corded lanyard device remains connected to the helm device, or whether the corded lanyard has been disconnected. In the wireless lanyard system, step 102 includes determining whether a radio signal from the operator fob 20 is received at the helm transceiver 18. If the operator device, whether the wireless operator fob 20 or the corded operator device worn by the operator and connected to the helm device, indicates that the operator is within the permitted zone, then the inquiry is complete and the lanyard control module 49 waits until the start of the next polling interval at 103 to re-perform the inquiry.

If the operator fob 20 is not within the permitted zone Z—e.g., the lanyard is disconnected, no responsive signal is received from the operator fob 20, or the operator distance of the operator fob 20 is determined to be greater than the current radius of the permitted zone Z— a lanyard event is then generated at step 104. Instructions to reduce engine RPM at a predetermined reduction rate is generated at step 106 and, once the engine RPM reaches an idle threshold at step 108, the gear system 64 is shifted to neutral at step 110, after which the lanyard system is deactivated at step 112 such that no further lanyard events are generated. Thus, the propulsion system is available for the operator or a passenger to immediately resume control thereof. For example, control may be resumed by shifting the throttle/shift lever 68 into neutral handle position to match the state of the gear system, and then may be shifted out of neutral and the throttle engaged as usual.

FIG. 6 depicts another embodiment of a method 100, which is one exemplary method of operating a wireless lanyard system 10. Step 120 is executed to detect a condition indicating that operation of the wireless lanyard system should be initiated. In the example, operation of the wireless lanyard system is imitated based on any of the following conditions being true: the engine speed is greater than an engine speed threshold; the vessel speed is greater than a vessel speed threshold; the gear state is shifted out of a neutral position. In various embodiments, the lanyard control module 49 may be configured to check for any one or more of those conditions before initiating operation of the wireless lanyard system, and may not be configured to utilize all three in the alternative (which would be somewhat redundant). Step 121 is then executed to define a radius $R_1$-$R_4$ of the permitted zone $Z_1$-$Z_4$. As described above, the radius of the permitted zone may be defined based on any of various current vessel conditions, such as the engine speed, the vessel speed, the gear state, a GPS location of the marine vessel, an IMU input, etc.

A location inquiry signal is generated at step 122, such as by operating the helm transceiver 18 to generate an inquiry signal to the operator fob 20. If the operator fob 20 receives the inquiry signal, it returns an operator location signal indicating that the inquiry signal was received. In certain embodiments, the operator location signal may contain an operator distance, as described above. In other embodiments, the operator location signal may simply be a signal identifying the operator fob 20 providing confirmation of receipt of the inquiry signal. If an operator location signal is received at step 124, step 126 is implemented to determine whether the operator is within the permitted zone Z. This step may be implemented, for example, in an embodiment where the operator location signal includes an operator distance. For example, the operator distance may be compared to the assigned radius $R_1$-$R_4$ of the permitted zone $Z_1$-$Z_4$ currently being implemented based on the vessel conditions.

If the operator is within the permitted zone Z, then the inquiry is complete and the lanyard control module 49 waits until the end of the polling interval to re-conduct the inquiry. If the operator is not determined within the permitted zone at step 126, then a warning alert is generated at step 128, and the lanyard control module 49 monitors the permitted zone for the warning period at step 30 to locate the operator. If the operator does not appear within the permitted zone Z for the warning period, then a lanyard event is generated at step 132.

If no operator location signal is received at all from the operator fob 20 at step 124, then the lanyard event is generated at step 132. Thus, in the depicted embodiment, a warning period is implemented if a signal is received from the operator fob 20, but the operator has left the permitted zone. But, if no signal is received from the operator fob 20 at all, then the lanyard control module 49 assumes that the operator has fallen overboard and immediately generates a lanyard event at step 132. In other embodiments, the system may be programmed differently, such as to always implement the warning period under conditions where the operator is not located in the permitted zone Z (i.e., whether or not the operator location signal is received) or to never implement the warning period and always immediately generate the lanyard event upon determining that the operator is not within the permitted zone Z.

Once the lanyard event is generated, the propulsion device is controlled accordingly, such as to decrease engine RPM at the predetermined reduction rate and shift to neutral. In other embodiments, such as in a system with direct linkage between the throttle/shift lever 68 and the gear system 64 (rather than a DTS system), the propulsion device may be turned off at step 134 in response to the lanyard event.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A wireless lanyard system for a marine vessel propelled by at least one propulsion device, the system comprising:
   an operator fob configured to be worn by an operator of the marine vessel;
   a helm transceiver configured to receive radio signals from the operator fob;
   a controller configured to:
      define a permitted zone with respect to a helm area of the marine vessel based on at least one vessel condition;
      determine based on communications between the operator fob and the helm transceiver whether the operator is within the permitted zone with respect to the helm area;
      generate a lanyard event when the operator is not within the permitted zone; and
      control at least one propulsion device on the marine vessel based on the lanyard event.

2. The system of claim 1, wherein the at least one vessel condition includes at least one of a vessel speed, a propulsion device RPM, gear state, a vessel location, or vessel orientation information.

3. The system of claim 1, wherein the controller is configured to define a radius of the permitted zone.

4. The system of claim 3, wherein the controller is further configured to:
   determine an operator distance between the operator fob and the helm transceiver based on the communications between the operator fob and the helm transceiver; and
   determine whether the operator is within the permitted zone based on a comparison between the operator distance and the radius of the permitted zone.

5. The system of claim 4, wherein the controller is configured to compare a vessel speed of the marine vessel to at least one threshold vessel speed and to define the radius of the permitted zone based on the comparison.

6. The system of claim 3, wherein the controller is configured to define the radius of the permitted zone based on a GPS location of the marine vessel.

7. The system of claim 1, wherein the controller is further configured to determine that the operator is not within the permitted zone for a predefined warning period prior to generating the lanyard event.

8. The system of claim 7, wherein the controller is further configured to generate an auditory warning alert upon detecting that the operator is not within the permitted zone for the predefined warning period.

9. The system of claim 1, wherein the controller is further configured to adjust the permitted zone based on a change in the vessel condition.

10. The system of claim 1 configured to, upon generation of the lanyard event, control the propulsion device to reduce an engine rpm to an idle rpm or to turn off the propulsion device.

11. A method of operating a wireless lanyard system on a marine vessel having at least one propulsion device, the method comprising:
    defining a permitted zone for an operator with respect to a helm area of the marine vessel based on at least one vessel condition;
    operating an operator fob worn by an operator and a helm transceiver to communicate and receive an operator location signal;
    determining whether the operator is within the permitted zone with respect to the helm area based on the operator location signal;
    generating a lanyard event when the operator is not within the permitted zone; and
    controlling at least one propulsion device on the marine vessel based on the lanyard event.

12. The method of claim 11, wherein the at least one vessel condition includes at least one of a vessel speed, a propulsion device RPM, gear state, a vessel location, or vessel orientation information.

13. The method of claim 11, wherein defining the permitted zone includes defining a radius of the permitted zone based on the at least one vessel condition.

14. The method of claim 13, further comprising determining an operator distance between the operator fob and the helm transceiver based on the operator location signal; and
wherein determining whether the operator is within the permitted zone includes comparing the operator distance to the radius of the permitted zone.

15. The method of claim 13, further comprising comparing a vessel speed of the marine vessel to at least one threshold vessel speed and defining the radius of the permitted zone based on the comparison.

16. The method of claim 13, further comprising defining the radius of the permitted zone based on a GPS location of the marine vessel.

17. The method of claim 11, further comprising determining that the operator is not within the permitted zone for a predefined warning period prior to generating the lanyard event.

18. The method of claim 17, further comprising generating an auditory warning alert upon detecting that the operator is not within the permitted zone for the predefined warning period.

19. The method of claim 11, further comprising adjusting the permitted zone based on a change in the vessel condition.

20. The method of claim 19, further comprising adjusting a radius of the permitted zone based on a change in at least one of an engine rpm or a vessel speed such that a radius of the permitted zone decreases as the engine rpm or the vessel speed increases.

21. The method of claim 11, wherein the step of defining the permitted zone for the operator with respect to a helm of the marine vessel based on at least one vessel condition includes defining the permitted zone once at least one of a gear system of the propulsion device is not in a neutral gear position or a vessel speed of the marine vessel is greater than a threshold vessel speed.

* * * * *